US011143742B2

(12) United States Patent
Shu et al.

(10) Patent No.: US 11,143,742 B2
(45) Date of Patent: Oct. 12, 2021

(54) DIGITAL RECEIVING APPARATUS, SYSTEM, AND METHOD FOR TRACKING AND OBSERVING TARGET RADIO SOURCE

(71) Applicants: INSTITUTE OF AUTOMATION, CHINESE ACADEMY OF SCIENCES, Beijing (CN); GUANGZHOU ARTIFICIAL INTELLIGENCE AND ADVANCED COMPUTING INSTITUTE OF CASIA, Guangzhou (CN)

(72) Inventors: Lin Shu, Beijing (CN); Jie Hao, Beijing (CN); Jun Liang, Beijing (CN); Yafang Song, Beijing (CN); Liangtian Zhao, Beijing (CN); Qiuxiang Fan, Beijing (CN); Hui Feng, Beijing (CN); Wenqing Hu, Beijing (CN)

(73) Assignees: INSTITUTE OF AUTOMATION, CHINESE ACADEMY OF SCIENCES;, Beijing (CN); GUANGZHOU ARTIFICIAL INTELLIGENCE AND ADVANCED COMPUTING INSTITUTE OF CASIA, Guangzhou (CN)

( * ) Notice: Subject to any disclaimer, the term of this patent is extended or adjusted under 35 U.S.C. 154(b) by 0 days.

(21) Appl. No.: 17/265,206

(22) PCT Filed: May 25, 2020

(86) PCT No.: PCT/CN2020/092037
§ 371 (c)(1),
(2) Date: Feb. 2, 2021

(65) Prior Publication Data
US 2021/0255277 A1 Aug. 19, 2021

(30) Foreign Application Priority Data
Feb. 19, 2020 (CN) .......................... 202010102498.8

(51) Int. Cl.
*G01S 7/295* (2006.01)
*G01S 13/12* (2006.01)
(Continued)

(52) U.S. Cl.
CPC ............ *G01S 7/295* (2013.01); *G01S 7/2883* (2021.05); *G01S 7/2921* (2013.01); *G01S 13/12* (2013.01)

(58) Field of Classification Search
None
See application file for complete search history.

(56) References Cited

U.S. PATENT DOCUMENTS

2011/0249769 A1  10/2011  Kang et al.
2018/0108113 A1*  4/2018  Guo .......................... G06T 1/60
2020/0382170 A1* 12/2020  Lang ........................ G01S 7/354

FOREIGN PATENT DOCUMENTS

| CN | 102394855 A | 3/2012 |
|----|-------------|--------|
| CN | 202794329 U | 3/2013 |
| CN | 106299702 A | 1/2017 |

* cited by examiner

*Primary Examiner* — Whitney Moore
(74) *Attorney, Agent, or Firm* — Bayramoglu Law Offices LLC

(57) ABSTRACT

A digital receiving apparatus includes an analog-to-digital conversion module, a polyphase filter module, a fast Fourier transform module and a phase compensation module, which transforms signals of a target radio source from time domain to frequency domain. It further includes a standard time acquisition module configured to acquire a standard timestamp, a communication module configured to communicate with a host computer, a delay parameter temporary storage module configured to store a to-be-compensated delay parameter, a control enable module configured to generate an enable signal, a delay module configured to perform delay, and a phase parameter generation module configured (Continued)

to temporarily store the to-be-compensated delay parameter and convert it into a phase compensation parameter. The present invention achieves precise synchronous system startup, and the to-be-compensated parameter is updated and aligned in real time to compensate for a time-varying delay difference to accurately track with precision and observe the target radio source.

20 Claims, 2 Drawing Sheets

(51) Int. Cl.
*G01S 7/292* (2006.01)
*G01S 7/288* (2006.01)

US 11,143,742 B2

DIGITAL RECEIVING APPARATUS, SYSTEM, AND METHOD FOR TRACKING AND OBSERVING TARGET RADIO SOURCE

CROSS REFERENCE TO THE RELATED APPLICATIONS

This application is the national phase entry of International Application No. PCT/CN2020/092037, filed on May 25, 2020, which is based upon and claims priority to Chinese Patent Application No. 202010102498.8, filed on Feb. 19, 2020, the entire contents of which are incorporated herein by reference.

TECHNICAL FIELD

The present invention belongs to the field of signal processing technologies, and more particularly, relates to a digital receiving apparatus, system, and method for tracking and observing a target radio source.

BACKGROUND

An aperture synthesis radio telescope used in the scientific observation of radio astronomy is composed of an array, including a plurality of antennas. These radio telescopes feature high spatial resolution and are highly sensitive. The antennas in the antenna array can take aim on a target radio source for tracking and observation. Such targets are artificial celestial bodies, such as a satellite, or a natural celestial object, such as the sun. The heliometer, located in Mingantu, Inner Mongolia, is used to track and observe the sun to study and predict solar eruptions. Solar storms caused by solar activities can produce violent disturbances in near-earth space, thereby seriously threatening space security and the operation of a series of high-tech systems such as aerospace, communications, navigation, power grids, and national defense. It is highly desirable, therefore, to develop, for an aperture synthesis radio telescope, a digital receiving system for tracking and observing a target radio source such as the sun.

In the process of tracking and observing a target radio source, the antenna array should be capable of precisely aiming at the target radio source. Due to the rotation of the earth, delay differences between the target radio source signal at different moments and two antennas are different. In order to achieve accurate tracking and observation of the target radio source, on the one hand, to determine the initial position of the observation, the start time of the digital receiving system must be precisely recorded, and compensation parameters at a corresponding moment are acquired for delay compensation; on the other hand, to guarantee tracking accuracy, the time-varying delay differences must be compensated for in real time, and the interval of time change is in seconds. This poses a significant challenge for the digital receiving system.

In general, the prior art cannot achieve precise tracking and observation of the target radio source, and therefore it is highly desirable to provide a system for precisely tracking and observing a target radio source in this field.

SUMMARY

In order to solve the problem that prior digital receiving systems for an aperture synthesis radio telescope cannot precisely track and observe the target radio source, the present invention provides a digital receiving apparatus for tracking and observing a target radio source. The digital receiving apparatus includes an analog-to-digital conversion module, a delay parameter temporary storage module, a polyphase filter module, a fast Fourier transform module, a phase compensation module, a phase parameter generation module, a standard time acquisition module, a control enable module, a communication module, and a delay module.

The analog-to-digital conversion module is configured to acquire a real-time antenna signal from the target radio source, acquire a to-be-compensated delay parameter in the delay parameter temporary storage module at a corresponding moment based on an update enable sent by the control enable module, compensate the antenna signal by a delay equal to an integral multiple of a sampling period in combination with a read enable and a write enable, and then send the antenna signal to the polyphase filter module.

The polyphase filter module is configured to perform polyphase filtering on the delay-compensated antenna signal and send the filtered signal to the fast Fourier transform module.

The fast Fourier transform module is configured to perform a fast Fourier transform on the filtered antenna signal and send the transformed frequency-domain signal to the phase compensation module.

The phase compensation module is configured to compensate for, based on a phase compensation parameter sent by the phase parameter generation module, a phase difference of the transformed frequency-domain signal caused by a delay difference less than the sampling period, and output a spectrum signal for tracking and observing the target radio source.

The standard time acquisition module is configured to acquire a timestamp of a standard time server and send the timestamp to the control enable module.

The communication module is configured to establish a communication between a host computer and each of the delay parameter temporary storage module, the control enable module and the phase parameter generation module, send an acquired control instruction sent by the host computer to the control enable module, and send an acquired current to-be-compensated parameter sent by the host computer to the delay parameter temporary storage module and the phase parameter generation module.

The control enable module is configured to generate the read enable, the write enable and the update enable based on the timestamp of the standard time server and the control instruction sent by the host computer, and send the read enable, the write enable and the update enable to the delay parameter temporary storage module, the delay module, and the analog-to-digital conversion module.

The delay parameter temporary storage module is configured to temporarily store a to-be-compensated delay parameter that is equal to an integral multiple of the sampling period in a continuous observation period.

The delay module is configured to delay the read enable by a set time and send the read enable to the phase parameter generation module.

The phase parameter generation module is configured to temporarily store a to-be-compensated delay parameter less than the sampling period in a continuous observation period, read the to-be-compensated delay parameter less than the sampling period at a corresponding moment according to a read enable signal outputted by the delay module, and convert the to-be-compensated delay parameter into a phase compensation parameter.

In some preferred embodiments, the standard time acquisition module is connected to the control enable module.

The control enable module is further connected to the delay parameter temporary storage module, the delay module, the analog-to-digital conversion module, and the communication module, respectively.

The communication module is further connected to the delay parameter temporary storage module and the phase parameter generation module, respectively.

The delay module is further connected to the phase parameter generation module.

The delay parameter temporary storage module is further connected to the analog-to-digital conversion module.

The analog-to-digital conversion module, the polyphase filter module, the fast Fourier transform module, and the phase compensation module are successively connected.

The phase parameter generation module is further connected to the phase compensation module.

In some preferred embodiments, a window function of the polyphase filter module is a Hamming window.

In another aspect of the present invention, a digital receiving system for tracking and observing a target radio source is proposed. The digital receiving system includes a host computer, a standard time server, and one or more digital receiving apparatuses for tracking and observing the target radio source described above.

The system time of the host computer and the system time of the digital receiving apparatus for tracking and observing the target radio source are synchronized with the standard time of the standard time server.

The host computer is communicatively connected to the digital receiving apparatus for tracking and observing the target radio source. The host computer is configured to set a synchronous start time of the digital receiving apparatus for tracking and observing the target radio source, calculate in real time a to-be-compensated delay of the target radio source under observation according to the system time, update in real time the to-be-compensated delay parameter equal to an integral multiple of the sampling period to the delay parameter temporary storage module in the digital receiving apparatus for tracking and observing the target radio source, and update in real time the to-be-compensated delay parameter less than the sampling period to the phase parameter generation module in the digital receiving apparatus for tracking and observing the target radio source.

In the third aspect of the present invention, a digital receiving method for tracking and observing a target radio source based on the digital receiving system for tracking and observing the target radio source described above is proposed. The digital receiving method includes:

step S10, starting the digital receiving system for tracking and observing the target radio source according to a set start mode, and enabling the digital receiving apparatus to start to work;

step S20, acquiring in real time, by the analog-to-digital conversion module in the digital receiving apparatus, the to-be-compensated delay parameter at the corresponding moment from the delay parameter temporary storage module according to the update enable, and performing delay compensation on a collected original antenna signal in real time in combination with the write enable and the read enable;

step S30, performing, by the polyphase filter module in the digital receiving apparatus, signal filtering according to data outputted by the previous level of the polyphase filter module and a data valid signal, and performing, by the fast Fourier transform module in the digital receiving apparatus, fast Fourier transform processing according to data outputted by the previous level of the fast Fourier transform module and a data valid signal;

step S40, delaying, by the delay module in the digital receiving apparatus, the read enable outputted by the control enable module by a set time to align the read enable with data outputted by the fast Fourier transform module;

step S50, reading, by the phase parameter generation module in the digital receiving apparatus, the to-be-compensated delay parameter less than the sampling period at the corresponding moment according to the read enable outputted by the delay module and an initial storage address of the to-be-compensated parameter, and converting the to-be-compensated delay parameter into a phase compensation parameter, wherein the initial storage address is determined by the control enable module; and step S60, performing, by the phase compensation module in the digital receiving apparatus based on the phase compensation parameter, corresponding phase compensation on the data outputted by the fast Fourier transform module, and outputting results.

In some preferred embodiments, the set start mode includes a host computer timing start mode, a digital receiving apparatus timing start mode, and an external input channel associated pulse start mode.

The host computer timing start mode is suitable for a system with only one digital receiving apparatus.

The digital receiving apparatus timing start mode is suitable for a system with one or more digital receiving apparatuses.

The external input channel associated pulse start mode is suitable for a system with one or more digital receiving apparatuses and analog input signals having channel associated pulse identification.

In some preferred embodiments, the host computer timing start mode includes:

step Q10, synchronizing the host computer and the digital receiving apparatus with the standard time of the standard time server, and setting a start time of the digital receiving apparatus by the host computer;

step Q11, when the set start time is reached, issuing, by the host computer, a start instruction to the digital receiving apparatus;

step Q12, forwarding, by the communication module in the digital receiving apparatus, the received start instruction to the control enable module; and step Q13, generating, by the control enable module, a write enable, an update enable, and a read enable according to the start instruction, acquiring a current timestamp at a first rising edge of the write enable from the standard time acquisition module as an exact time of system startup, calculating a storage address of the to-be-compensated parameter at the corresponding moment according to the exact time, and enabling the digital receiving apparatus to start to work.

In some preferred embodiments, the digital receiving apparatus timing start mode includes:

step Q20, synchronizing the host computer and the digital receiving apparatus with the standard time of the standard time server, and setting start times of the digital receiving apparatuses by the host computer;

step Q21, issuing, by the host computer, the start times to the corresponding digital receiving apparatuses, respectively;

step Q22, forwarding, by the communication modules in the digital receiving apparatuses, the corresponding start times to respective control enable modules of the digital receiving apparatuses, respectively; and step Q23, monitoring, by the control enable modules, the current timestamps acquired from the standard time acquisition modules, generating the write enable, the update enable and the read enable when the current timestamps are equal to the set start time, and enabling the digital receiving apparatuses to start to work.

In some preferred embodiments, the external input channel associated pulse start mode includes:

step Q30, synchronizing the host computer and the digital receiving apparatus with the standard time of the standard time server, and setting start times of the digital receiving apparatuses by the host computer;

step Q31, when the set start times are reached, issuing, by the host computer, an external input channel associated pulse start instruction to a primary digital receiving apparatus of the digital receiving apparatuses;

step Q32, generating, by the control enable module in the primary digital receiving apparatus, start enable according to the external input channel associated pulse start instruction, and outputting the start enable to a corresponding external multiplexer;

step Q33, dividing, by the external multiplexer, the start enable into a plurality of channels, and inputting the plurality of channels to the digital receiving apparatuses, respectively; and step Q34, after the control enable modules of the digital receiving apparatuses receive the start enable, monitoring, by the control enable modules of the digital receiving apparatuses, an external input channel associated pulse, generating a write enable, an update enable, and a read enable according to the start enable, acquiring a current timestamp at a first rising edge of the write enable from the standard time acquisition module as an exact time of system startup, calculating a storage address of the to-be-compensated parameter at the corresponding moment according to the exact time, and enabling the digital receiving apparatuses to start to work.

In the fourth aspect of the present invention, a storage device is provided, wherein a plurality of programs are stored in the storage device, and the programs are adapted to be loaded and executed by a processor to implement the digital receiving method for tracking and observing the target radio source described above.

In the fifth aspect of the present invention, a processing device is proposed, including a processor and a storage device. The processor is adapted to execute programs. The storage device is adapted to store a plurality of programs. The programs are adapted to be loaded and executed by the processor to implement the digital receiving method for tracking and observing the target radio source described above.

The present invention has the following advantages.

(1) The digital receiving system for tracking and observing a target radio source according to the present invention achieves precise synchronous startup, precisely records the actual time of system startup and determines the initial storage address of the to-be-compensated parameter, thereby ensuring the accuracy of the initial position for tracking and observing the target radio source.

(2) The digital receiving system for tracking and observing a target radio source according to the present invention achieves precise tracking and observation of the target radio source by compensating for the time-varying delay difference through real-time update and alignment application of the to-be-compensated parameter.

BRIEF DESCRIPTION OF THE DRAWINGS

Other features, objectives, and advantages of the present invention will become more apparent by reading the detailed description of the non-restrictive embodiments with reference to the drawings.

DETAILED DESCRIPTION OF THE EMBODIMENTS

Figure 1:
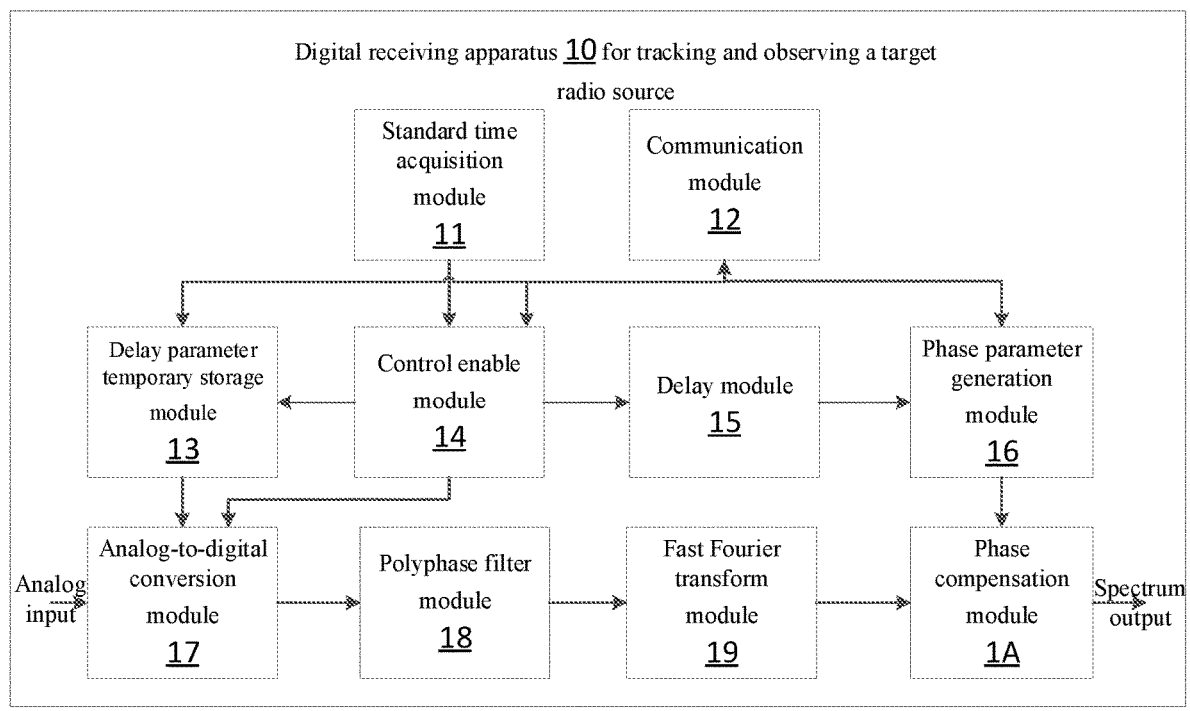
FIG. 1 is a schematic frame diagram of a digital receiving apparatus for tracking and observing a target radio source according to the present invention.

The present invention is described in further detail below with reference to the drawings and embodiments. It is understandable that the specific embodiments described herein are intended only to explain the related invention rather than to limit the present invention. In addition, it should be noted that, for ease of description, only parts relevant to the related invention are shown.

It should be noted that the embodiments in the present invention and features in the embodiments may be combined when not in conflict. The present invention will be described in detail below with reference to the drawings and embodiments.

The present invention provides a digital receiving apparatus for tracking and observing a target radio source. The digital receiving apparatus includes an analog-to-digital conversion module, a delay parameter temporary storage module, a polyphase filter module, a fast Fourier transform module, a phase compensation module, a phase parameter generation module, a standard time acquisition module, a control enable module, a communication module, and a delay module.

The analog-to-digital conversion module is configured to acquire a real-time antenna signal from the target radio source, acquire a to-be-compensated delay parameter in the delay parameter temporary storage module at a corresponding moment based on an update enable sent by the control enable module, compensate the antenna signal by a delay equal to an integral multiple of a sampling period in combination with a read enable and a write enable, and then send the antenna signal to the polyphase filter module.

The polyphase filter module is configured to perform polyphase filtering on the delay-compensated antenna signal and send the filtered signal to the fast Fourier transform module.

The fast Fourier transform module is configured to perform a fast Fourier transform on the filtered antenna signal and send the transformed frequency-domain signal to the phase compensation module.

The phase compensation module is configured to compensate for, based on a phase compensation parameter sent by the phase parameter generation module, a phase difference of the transformed frequency-domain signal caused by a delay difference less than the sampling period, and output a spectrum signal for tracking and observing the target radio source.

The standard time acquisition module is configured to acquire a timestamp of a standard time server and send the timestamp to the control enable module.

The communication module is configured to establish a communication between a host computer and each of the delay parameter temporary storage module, the control enable module and the phase parameter generation module, send an acquired control instruction sent by the host computer to the control enable module, and send an acquired current to-be-compensated parameter sent by the host computer to the delay parameter temporary storage module and the phase parameter generation module.

The control enable module is configured to generate the read enable, the write enable, and the update enable based on the timestamp of the standard time server and the control instruction sent by the host computer, and send the read enable, the write enable, and the update enable to the delay parameter temporary storage module, the delay module, and the analog-to-digital conversion module.

The delay parameter temporary storage module is configured to temporarily store a to-be-compensated delay parameter that is equal to an integral multiple of the sampling period in a continuous observation period.

The delay module is configured to delay the read enable by a set time and send the read enable to the phase parameter generation module.

The phase parameter generation module is configured to temporarily store a to-be-compensated delay parameter less than the sampling period in a continuous observation period, read the to-be-compensated delay parameter less than the sampling period at a corresponding moment according to a read enable signal outputted by the delay module, and convert the to-be-compensated delay parameter into a phase compensation parameter.

To describe the digital receiving apparatus for tracking and observing a target radio source according to the present invention more clearly, the modules in the embodiments of the present invention are described below in detail with reference to FIG. 1.

The digital receiving apparatus 10 for tracking and observing a target radio source according to an embodiment of the present invention includes the analog-to-digital conversion module 17, the delay parameter temporary storage module 13, the polyphase filter module 18, the fast Fourier transform module 19, the phase compensation module 1A, the phase parameter generation module 16, the standard time acquisition module 11, the control enable module 14, the communication module 12, and the delay module 15. The modules are described in detail as follows.

The analog-to-digital conversion module 17 is configured to acquire a real-time antenna signal from the target radio source, acquire a to-be-compensated delay parameter in the delay parameter temporary storage module 13 at a corresponding moment based on an update enable sent by the control enable module 14, compensate the antenna signal by a delay equal to an integral multiple of the sampling period in combination with a read enable and a write enable, and then send the antenna signal to the polyphase filter module 18.

The polyphase filter module 18 is configured to perform polyphase filtering on the delay-compensated antenna signal and send the filtered signal to the fast Fourier transform module 19.

The fast Fourier transform module 19 is configured to perform a fast Fourier transform on the filtered antenna signal and send the transformed frequency-domain signal to the phase compensation module 1A.

The phase compensation module 1A is configured to compensate, based on the phase compensation parameter sent by the phase parameter generation module 16, a phase difference of the transformed frequency-domain signal caused by a delay difference less than the sampling period, and output a spectrum signal for tracking and observing the target radio source.

The standard time acquisition module 11 is configured to acquire a timestamp of a standard time server and send the timestamp to the control enable module 14.

The communication module 12 is configured to establish a communication between a host computer and each of the delay parameter temporary storage module 13, the control enable module 14 and the phase parameter generation module 16, send an acquired control instruction sent by the host computer to the control enable module 14, and send an acquired current to-be-compensated parameter sent by the host computer to the delay parameter temporary storage module 13 and the phase parameter generation module 16.

The control enable module 14 is configured to generate the read enable, the write enable, and the update enable based on the timestamp of the standard time server and the control instruction sent by the host computer and send the read enable, the write enable, and the update enable to the delay parameter temporary storage module 13, the delay module 15, and the analog-to-digital conversion module 17.

The delay parameter temporary storage module 13 is configured to temporarily store a to-be-compensated delay parameter that is equal to an integral multiple of the sampling period in a continuous observation period.

The delay module 15 is configured to delay the read enable by a set time and send the read enable to the phase parameter generation module 16.

The phase parameter generation module 16 is configured to temporarily store a to-be-compensated delay parameter less than the sampling period in a continuous observation period, read the to-be-compensated delay parameter less than the sampling period at a corresponding moment according to a read enable signal outputted by the delay module 15, and convert the to-be-compensated delay parameter into a phase compensation parameter.

The connection relationships among these modules are as follows.

The standard time acquisition module 11 is connected to the control enable module 14.

The control enable module 14 is further connected to the delay parameter temporary storage module 13, the delay module 15, the analog-to-digital conversion module 17, and the communication module 12, respectively.

The communication module 12 is further connected to the delay parameter temporary storage module 13 and the phase parameter generation module 16, respectively.

The delay module 15 is further connected to the phase parameter generation module 16.

The delay parameter temporary storage module 13 is further connected to the analog-to-digital conversion module 17.

The analog-to-digital conversion module 17, the polyphase filter module 18, the fast Fourier transform module 19, and the phase compensation module 1A are successively connected.

The phase parameter generation module 16 is further connected to the phase compensation module 1A.

The window function of the polyphase filter module 18 is configured according to different situations. In one embodiment of the present invention, a Hamming window is selected to reduce sidelobes and prevent radio frequency leakage, while having a flat response to reduce scalloping loss.

The second embodiment of the present invention provides a digital receiving system for tracking and observing a target radio source. The digital receiving system includes a host computer, a standard time server, and one or more digital receiving apparatuses for tracking and observing the target radio source described above.

The system time of the host computer and the system time of the digital receiving apparatus for tracking and observing the target radio source are synchronized with the standard time of the standard time server.

The host computer is communicatively connected to the digital receiving apparatus for tracking and observing the target radio source. The host computer is configured to set a synchronous start time of the digital receiving apparatus for tracking and observing the target radio source, calculate in real time a to-be-compensated delay of the target radio source under observation according to the system time, update in real time the to-be-compensated delay parameter equal to an integral multiple of the sampling period to the delay parameter temporary storage module in the digital receiving apparatus for tracking and observing the target radio source, and update in real time the to-be-compensated delay parameter less than the sampling period to the phase parameter generation module in the digital receiving apparatus for tracking and observing the target radio source.

The third embodiment of the present invention provides a digital receiving method for tracking and observing the target radio source based on the digital receiving system for tracking and observing the target radio source described above. The digital receiving method includes:

Step S10, the digital receiving system for tracking and observing the target radio source is started according to a set start mode, and the digital receiving apparatus starts to work.

Step S20, the analog-to-digital conversion module in the digital receiving apparatus acquires the to-be-compensated delay parameter at the corresponding moment in real time from the delay parameter temporary storage module according to the update enable, and performs delay compensation on a collected original antenna signal in real time in combination with the write enable and the read enable.

Step S30, the polyphase filter module in the digital receiving apparatus performs signal filtering according to data outputted by the previous level of the polyphase filter module and a data valid signal. The fast Fourier transform module in the digital receiving apparatus performs fast Fourier transform processing according to data outputted by the previous level of the fast Fourier transform module and a data valid signal.

Step S40, the delay module in the digital receiving apparatus delays the read enable outputted by the control enable module by a set time to align the read enable with data outputted by the fast Fourier transform module.

Step S50, the phase parameter generation module in the digital receiving apparatus reads the to-be-compensated delay parameter less than the sampling period at the corresponding moment according to the read enable outputted by the delay module and an initial storage address of the to-be-compensated parameter, and converts the to-be-compensated delay parameter into a phase compensation parameter, wherein the initial storage address is determined by the control enable module.

Step S60, the phase compensation module in the digital receiving apparatus performs, based on the phase compensation parameter, corresponding phase compensation on the data outputted by the fast Fourier transform module, and outputs the results.

The set start mode includes a host computer timing start mode, a digital receiving apparatus timing start mode, and an external input channel associated pulse start mode.

The host computer timing start mode is suitable for a system with only one digital receiving apparatus, and the starting process thereof specifically includes:

Step Q10, the host computer and the digital receiving apparatus are synchronized with the standard time of the standard time server, and the start time of the digital receiving apparatus is set by the host computer.

Step Q11, when the set start time is reached, the host computer issues a start instruction to the digital receiving apparatus.

Step Q12, the communication module in the digital receiving apparatus forwards the received start instruction to the control enable module.

Step Q13, the control enable module generates a write enable, an update enable, and a read enable according to the start instruction, acquires a current timestamp at a first rising edge of the write enable from the standard time acquisition module as an exact time of system startup, and calculates a storage address of the to-be-compensated parameter at the corresponding moment according to the exact time; and the digital receiving apparatus starts to work.

The digital receiving apparatus timing start mode is suitable for a system with one or more digital receiving apparatuses, and the starting process thereof specifically includes:

Step Q20, the host computer and the digital receiving apparatus are synchronized with the standard time of the standard time server, and the start times of the digital receiving apparatuses are set by the host computer.

Step Q21, the host computer issues the start times to the corresponding digital receiving apparatuses, respectively.

Step Q22, the communication modules in the digital receiving apparatuses forward the corresponding start times to respective control enable modules of the digital receiving apparatuses, respectively.

Step Q23, the control enable modules monitor the current timestamps acquired from the standard time acquisition modules, and generate a write enable, an update enable, and a read enable when the current timestamps are equal to the set start time, and the digital receiving apparatuses start to work.

The external input channel associated pulse start mode is suitable for a system with one or more digital receiving apparatuses and analog input signals having channel associated pulse identification, and the starting process thereof specifically includes:

Step Q30, the host computer and the digital receiving apparatus are synchronized with the standard time of the standard time server, and the start times of the digital receiving apparatuses are set by the host computer.

Step Q31, when the set start times are reached, the host computer issues an external input channel associated pulse start instruction to a primary digital receiving apparatus of the digital receiving apparatuses.

Step Q32, the control enable module in the primary digital receiving apparatus generates start enable according to the external input channel associated pulse start instruction, and outputs the start enable to a corresponding external multiplexer.

Step Q33, the external multiplexer divides the start enable into a plurality of channels, and inputs the plurality of channels to the digital receiving apparatuses, respectively.

Step Q34, after receiving the start enable, the control enable modules of the digital receiving apparatuses monitor an external input channel associated pulse and generate a write enable, an update enable, and a read enable according to the start enable, acquire a current timestamp at a first rising edge of the write enable from the standard time acquisition module as an exact time of system startup, and calculate a storage address of the to-be-compensated parameter at the corresponding moment according to the exact time; and the digital receiving apparatuses start to work.

After the system is started, the analog-to-digital conversion module 17, the polyphase filter module 18, the fast Fourier transform module 19, and the phase compensation module 1A in the digital receiving apparatus 10 start to work specifically by the following steps:

Step A10, the analog-to-digital conversion module 17 acquires in real time the to-be-compensated delay parameter at the corresponding moment from the delay parameter temporary storage module 13 according to the update enable, and performs delay compensation on a collected original antenna signal in real time in combination with the write enable and the read enable.

Step A11, the polyphase filter module 18 performs filtering according to data outputted by the analog-to-digital conversion module 17 and a data valid signal, and has a fixed processing time, which is related to the order of polyphase filtering and the filter length.

Step A12, the fast Fourier transform module 19 performs time-frequency conversion according to data outputted by the polyphase filter module 18 and a data valid signal, and also has a fixed processing time, which is related to the length and parallelism of the fast Fourier transform.

Step A13, the phase compensation module 1A performs corresponding phase compensation on data outputted by the fast Fourier transform module 19 and outputs the results.

The data valid signals are obtained by delaying, through the delay module 15, the read enable outputted by the control enable module 14 on a large scale by a set time, to align the read enable with the data outputted by the fast Fourier transform module 19. The phase parameter is obtained by calculating a to-be-compensated delay less than the sampling period at the corresponding moment, wherein the to-be-compensated delay is read by the phase parameter generation module 16 according to the read enable outputted by the delay module 15 and an initial storage address of the to-be-compensated parameter, and the initial storage address is determined by the control enable module 14.

At the same time, during the operation of the system, the host computer and the digital receiving apparatus 10 cooperate to implement real-time update and alignment application of the to-be-compensated parameter. In the tracking and observation of the target radio source, the radio source signal at different moments has different delay differences when arriving at two antennas. In order to compensate for the time-varying delay difference, it is necessary to constantly update a to-be-compensated delay to the digital receiving apparatus 10. Herein, the smaller the time change interval, the higher the precision of the tracking and observation. A smaller time change interval, however, requires an increase of the update speed of the host computer and the digital receiving apparatus 10. In order to simultaneously meet the requirements for the precision and the speed, both the delay parameter temporary storage module 13 and the phase parameter generation module 16 in the digital receiving apparatus 10 adopt a ping-pang structure, and can temporarily store a to-be-compensated parameter for a continuous period of time. The phase parameter generation module 16 temporarily stores the to-be-compensated delay less than the sampling period, instead of directly storing the phase parameter, which greatly reduces the storage burden.

In this system, the system time of the host computer and the system time of the digital receiving apparatus 10 are both synchronized with the standard time of the standard time server. During the operation of the system, the host computer estimates the processing progress of the digital receiving apparatus 10 according to the system time. The host computer updates pang memories of the delay parameter temporary storage module 13 and the phase parameter generation module 16 when the digital receiving apparatus 10 reads data from ping memories of the delay parameter temporary storage module 13 and the phase parameter generation module 16. The host computer updates the ping memories of the delay parameter temporary storage module 13 and the phase parameter generation module 16 when the digital receiving apparatus 10 reads data from the pang memories of the delay parameter temporary storage module 13 and the phase parameter generation module 16.

Figure 2:
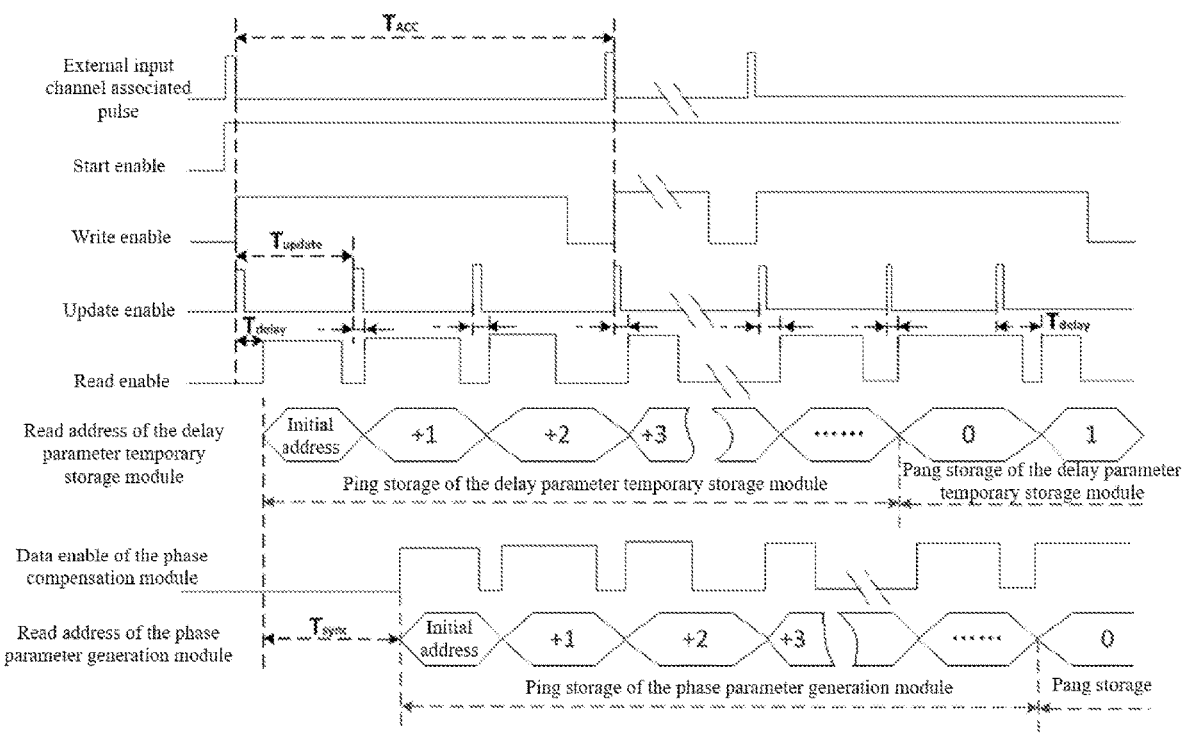
FIG. 2 is a timing diagram of important variables in a digital receiving apparatus for tracking and observing a target radio source in an external input channel associated pulse start mode according to an embodiment of the digital receiving apparatus of the present invention.

Similarly, during the operation of the system, the digital receiving apparatus 10 must precisely acquire the to-be-compensated parameter at the corresponding moment from the delay parameter temporary storage module 13 and the phase parameter generation module 16 according to the write enable, the update enable, and the read enable generated by the control enable module 14 and the recorded initial storage address of the to-be-compensated parameter. As shown in FIG. 2, a timing diagram of important variables in a digital receiving apparatus for tracking and observing a target radio source in an external input channel associated pulse start mode is shown according to an embodiment of the digital receiving apparatus of the present invention. TACC is an integration period, which is equal to an external input channel associated pulse period; $T_{update}$ is an update enable period, that is, an update period of the to-be-compensated parameter, which represents an interval of time change; $T_{delay}$ is an interval between a rising edge moment of the update enable and a rising edge moment of the corresponding read enable, and is greater than or equal to the maximum to-be-compensate delay at the corresponding moment and varies with time; and $T_{sync}$ is a delay from the output of the analog-to-digital conversion module 17 to the input of the phase compensation module, and is related to the order of polyphase filtering and the filter length. When the start enable is active, the write enable is periodically generated based on an external input channel associated high-level pulse. The write enable is active high. The control enable module 14 controls the generation of read enable according to the write enable, the update enable, and the to-be-compensated delay parameter at the corresponding moment. The read enable is also active high. The update enable period $T_{update}$ is generally less than the external input channel associated pulse period TACC. Once the update enable is active, the control enable module 14 will set the read enable to a low level when the high-level duration of the read enable is exactly equal to an integral multiple of the filter length. At the first rising edge of the read enable, the initial storage address of the to-be-compensated parameter recorded by the control enable module 14 is used as a read address of the delay parameter temporary storage module 13, and the to-be-compensated delay parameter is read from the ping memory. At each subsequent rising edge of the read enable, the read address of the delay parameter temporary storage module 13 is incremented by an interval of 1. When equal to the maximum address of the memory, the read address of the delay parameter temporary storage module 13 is set to zero at the next rising edge of the read enable, and ping-pang storage switching is performed. Parameter reading for the phase parameter generation module is similar to the above and thus is not described in detail herein.

It should be noted that the digital receiving system for tracking and observing a target radio source provided in the above embodiments is illustrated only by the division of the above functional modules. In practical applications, the above functions can be assigned to be completed by different functional modules according to the requirements. That is, the modules or steps in the embodiments of the present invention are re-decomposed or combined. For example, the modules in the above embodiments can be combined into one module or further divided into a plurality of sub-modules to complete all or part of the functions described above. The designations of the modules and the steps involved in the embodiments of the present invention are only for the purpose of distinguishing the modules or steps and shall not be construed as an improper limitation to the present invention.

The fourth embodiment of the present invention provides a storage device, wherein a plurality of programs are stored in the storage device, and the programs are adapted to be loaded and executed by a processor to implement the digital receiving method for tracking and observing the target radio source described above.

The fifth embodiment of the present invention provides a processing device, including a processor and a storage device. The processor is adapted to execute programs. The storage device is adapted to store a plurality of programs. The programs are adapted to be loaded and executed by the processor to implement the digital receiving method for tracking and observing the target radio source described above.

Those skilled in the art can clearly understand that, for the convenience and simplicity of the description, the specific working process and related description of the storage device and processing device described above may be obtained with reference to the corresponding process in the foregoing method embodiment, and thus are not repeated herein.

Those skilled in the art should be aware that the modules and method steps of each example described in the embodiments disclosed herein can be implemented by means of electronic hardware, computer software or a combination of both. Programs corresponding to software modules and method steps may be placed in a random access memory (RAM), a memory, a read-only memory (ROM), an electrically programmable ROM, an electrically erasable programmable ROM, a register, a hard disk, a removable disk, a compact disc read-only memory (CD-ROM), or any other forms of storage media well known in the technical field. In order to clearly illustrate the interchangeability of electronic hardware and software, the compositions and steps of each example are described generally in terms of functions in the above description. Whether these functions are performed in the form of electronic hardware or software depends on specific applications and design constraints of the technical solution. Those skilled in the art may use different methods for each particular application to implement the described functions, but such implementation shall not be considered beyond the scope of the present invention.

The terms "first", "second", and the like are used to distinguish similar objects, rather than to describe or indicate a particular order or sequence.

The term "include/comprise" or any other similar term is intended to cover non-exclusive inclusion, so that a process, method, item or device/apparatus including a series of elements not only includes the elements, but also includes other elements not clearly listed or elements inherent to the process, method, item or device/apparatus.

The technical solution of the present invention has thus been described in conjunction with the preferred implementations shown in the drawings. However, it is easy for those skilled in the art to understand that the scope of protection of the present invention is obviously not limited to these specific implementations. Those skilled in the art can make equivalent changes or replacements to related technical features without departing from the principle of the present invention. The technical solutions obtained by such changes or replacements shall fall within the scope of protection of the present invention.

What is claimed is:

1. A digital receiving apparatus for tracking and observing a target radio source, comprising
an analog-to-digital conversion module, a delay parameter temporary storage module, a polyphase filter module, a fast Fourier transform module, a phase compensation module, a phase parameter generation module, a standard time acquisition module, a control enable module, a communication module, and a delay module; wherein
the analog-to-digital conversion module is configured to acquire a real-time antenna signal from the target radio source, acquire a to-be-compensated delay parameter in the delay parameter temporary storage module at a corresponding moment based on an update enable sent by the control enable module, compensate the real-time antenna signal by a delay equal to an integral multiple of a sampling period in combination with a read enable and a write enable to obtain a delay-compensated antenna signal, and then send the delay-compensated antenna signal to the polyphase filter module;
the polyphase filter module is configured to perform polyphase filtering on the delay-compensated antenna signal to obtain a filtered antenna signal and send the filtered antenna signal to the fast Fourier transform module;
the fast Fourier transform module is configured to perform a fast Fourier transform on the filtered antenna signal to obtain a transformed frequency-domain signal and send the transformed frequency-domain signal to the phase compensation module;
the phase compensation module is configured to compensate for, based on a phase compensation parameter sent by the phase parameter generation module, a phase difference of the transformed frequency-domain signal, and output a spectrum signal for tracking and observing the target radio source, wherein the phase difference of the transformed frequency-domain signal is caused by a delay difference less than the sampling period;
the standard time acquisition module is configured to acquire a timestamp of a standard time server and send the timestamp to the control enable module;
the communication module is configured to establish a communication between a host computer and each of the delay parameter temporary storage module, the control enable module and the phase parameter generation module, send an acquired control instruction sent by the host computer to the control enable module, and send an acquired current to-be-compensated parameter sent by the host computer to the delay parameter temporary storage module and the phase parameter generation module;
the control enable module is configured to generate the read enable, the write enable and the update enable based on the timestamp of the standard time server and the acquired control instruction sent by the host computer, and send the read enable, the write enable and the update enable to the delay parameter temporary storage module, the delay module, and the analog-to-digital conversion module;
the delay parameter temporary storage module is configured to temporarily store the to-be-compensated delay parameter equal to an integral multiple of the sampling period in a continuous observation period;

the delay module is configured to delay the read enable by a set time to obtain a delayed read enable and send the delayed read enable to the phase parameter generation module; and the phase parameter generation module is configured to temporarily store a to-be-compensated delay parameter less than the sampling period in the continuous observation period, read the to-be-compensated delay parameter less than the sampling period at the corresponding moment according to a read enable signal outputted by the delay module, and convert the to-be-compensated delay parameter less than the sampling period into a phase compensation parameter.

2. The digital receiving apparatus for tracking and observing the target radio source according to claim 1, wherein
the standard time acquisition module is connected to the control enable module;
the control enable module is further connected to the delay parameter temporary storage module, the delay module, the analog-to-digital conversion module, and the communication module, respectively;
the communication module is further connected to the delay parameter temporary storage module and the phase parameter generation module, respectively;
the delay module is further connected to the phase parameter generation module;
the delay parameter temporary storage module is further connected to the analog-to-digital conversion module;
the analog-to-digital conversion module, the polyphase filter module, the fast Fourier transform module, and the phase compensation module are successively connected; and
the phase parameter generation module is further connected to the phase compensation module.

3. The digital receiving apparatus for tracking and observing the target radio source according to claim 2, wherein a window function of the polyphase filter module is a Hamming window.

4. The digital receiving apparatus for tracking and observing the target radio source according to claim 1, wherein a window function of the polyphase filter module is a Hamming window.

5. A digital receiving system for tracking and observing a target radio source, comprising a host computer, a standard time server, and one or more digital receiving apparatuses for tracking and observing the target radio source according to claim 1; wherein
a system time of the host computer and a system time of a digital receiving apparatus of the one or more digital receiving apparatuses for tracking and observing the target radio source are synchronized with a standard time of the standard time server;
the host computer is communicatively connected to the digital receiving apparatus for tracking and observing the target radio source; and
the host computer is configured to set a synchronous start time of the digital receiving apparatus for tracking and observing the target radio source, calculate in real time a to-be-compensated delay of the target radio source under observation according to the system time of the host computer and the system time of the digital receiving apparatus, update in real time the to-be-compensated delay parameter equal to the integral multiple of the sampling period to the delay parameter temporary storage module in the digital receiving apparatus for tracking and observing the target radio source, and update in real time the to-be-compensated delay parameter less than the sampling period to the phase parameter generation module in the digital receiving apparatus for tracking and observing the target radio source.

6. A digital receiving method based on the digital receiving system for tracking and observing the target radio source according to claim 5, comprising:
step S10, starting the digital receiving system for tracking and observing the target radio source according to a set start mode, and enabling the digital receiving apparatus to start to work;
step S20, acquiring in real time, by the analog-to-digital conversion module in the digital receiving apparatus, the to-be-compensated delay parameter at the corresponding moment from the delay parameter temporary storage module according to the update enable, and performing, by the analog-to-digital conversion module in the digital receiving apparatus, a delay compensation on a collected original antenna signal in real time in combination with the write enable and the read enable;
step S30, performing, by the polyphase filter module in the digital receiving apparatus, signal filtering according to data outputted by the analog-to-digital conversion module and a first data valid signal, and performing, by the fast Fourier transform module in the digital receiving apparatus, fast Fourier transform processing according to data outputted by the polyphase filter module and a second data valid signal;
step S40, delaying, by the delay module in the digital receiving apparatus, the read enable outputted by the control enable module by the set time to align the read enable with data outputted by the fast Fourier transform module;
step S50, reading, by the phase parameter generation module in the digital receiving apparatus, the to-be-compensated delay parameter less than the sampling period at the corresponding moment according to the delayed read enable outputted by the delay module and an initial storage address of the to-be-compensated delay parameter, and converting, by the phase parameter generation module in the digital receiving apparatus, the to-be-compensated delay parameter less than the sampling period into the phase compensation parameter, wherein the initial storage address is determined by the control enable module; and
step S60, performing, by the phase compensation module in the digital receiving apparatus based on the phase compensation parameter, a phase compensation on the data outputted by the fast Fourier transform module, and outputting results by the phase compensation module in the digital receiving apparatus.

7. The digital receiving method for tracking and observing the target radio source according to claim 6, wherein
the set start mode comprises a host computer timing start mode, a digital receiving apparatus timing start mode, and an external input channel associated pulse start mode;
the host computer timing start mode is applied to the digital receiving system with only the digital receiving apparatus;
the digital receiving apparatus timing start mode is applied to the digital receiving system with the one or more digital receiving apparatuses; and the external input channel associated pulse start mode is applied to the digital receiving system with the one or more digital receiving apparatuses and analog input signals having channel associated pulse identification.

8. The digital receiving method for tracking and observing the target radio source according to claim 7, wherein
the host computer timing start mode comprises:
step Q10, synchronizing the host computer and the digital receiving apparatus with the standard time of the standard time server, and setting the synchronous start time of the digital receiving apparatus by the host computer;
step Q11, when the synchronous start time is reached, issuing, by the host computer, a start instruction to the digital receiving apparatus;
step Q12, forwarding, by the communication module in the digital receiving apparatus, the start instruction to the control enable module; and
step Q13, generating, by the control enable module, the write enable, the update enable and the read enable according to the start instruction, acquiring, by the control enable module, a current timestamp at a first rising edge of the write enable from the standard time acquisition module as an exact time of system startup, calculating the initial storage address of the to-be-compensated delay parameter at the corresponding moment according to the exact time, and enabling the digital receiving apparatus to start to work.

9. The digital receiving method for tracking and observing the target radio source according to claim 7, wherein
the digital receiving apparatus timing start mode comprises:
step Q20, synchronizing the host computer and the digital receiving apparatus with the standard time of the standard time server, and setting start times of the one or more digital receiving apparatuses by the host computer;
step Q21, issuing, by the host computer, the start times to the one or more digital receiving apparatuses, respectively;
step Q22, forwarding, by the communication modules in the one or more digital receiving apparatuses, the start times to the control enable modules of the one or more digital receiving apparatuses, respectively; and
step Q23, monitoring, by the control enable modules, the current timestamps acquired from the standard time acquisition modules, generating, by the control enable modules, the write enable, the update enable, and the read enable when the current timestamps are equal to the set start times, and enabling the one or more digital receiving apparatuses to start to work.

10. The digital receiving method for tracking and observing the target radio source according to claim 7, wherein
the external input channel associated pulse start mode comprises:
step Q30, synchronizing the host computer and the digital receiving apparatus with the standard time of the standard time server, and setting start times of the one or more digital receiving apparatuses by the host computer;
step Q31, when the start times are reached, issuing, by the host computer, an external input channel associated pulse start instruction to a primary digital receiving apparatus of the one or more digital receiving apparatuses;
step Q32, generating, by the control enable module in the primary digital receiving apparatus, a start enable according to the external input channel associated pulse start instruction, and outputting, by the control enable module in the primary digital receiving apparatus, the start enable to an external multiplexer;
step Q33, dividing, by the external multiplexer, the start enable into a plurality of channels, and inputting, by the external multiplexer, the plurality of channels to the one or more digital receiving apparatuses, respectively; and
step Q34, after the control enable modules of the one or more digital receiving apparatuses receive the start enable, monitoring, by the control enable modules of the one or more digital receiving apparatuses, an external input channel associated pulse, generating, by the control enable modules of the one or more digital receiving apparatuses, the write enable, the update enable, and the read enable according to the start enable, acquiring a current timestamp at a first rising edge of the write enable from the standard time acquisition module as an exact time of system startup, calculating the initial storage address of the to-be-compensated delay parameter at the corresponding moment according to the exact time, and enabling the one or more digital receiving apparatuses to start to work.

11. A storage device, wherein a plurality of programs are stored in the storage device, and the plurality of programs are adapted to be loaded and executed by a processor to implement the digital receiving method for tracking and observing the target radio source according to claim 6.

12. The storage device according to claim 11, wherein
the set start mode comprises a host computer timing start mode, a digital receiving apparatus timing start mode, and an external input channel associated pulse start mode;
the host computer timing start mode is applied to the digital receiving system with only the digital receiving apparatus;
the digital receiving apparatus timing start mode is applied to the digital receiving system with the one or more digital receiving apparatuses; and
the external input channel associated pulse start mode is applied to the digital receiving system with the one or more digital receiving apparatuses and analog input signals having channel associated pulse identification.

13. The storage device according to claim 12, wherein
the host computer timing start mode comprises:
step Q10, synchronizing the host computer and the digital receiving apparatus with the standard time of the standard time server, and setting the synchronous start time of the digital receiving apparatus by the host computer;
step Q11, when the synchronous start time is reached, issuing, by the host computer, a start instruction to the digital receiving apparatus;
step Q12, forwarding, by the communication module in the digital receiving apparatus, the start instruction to the control enable module; and
step Q13, generating, by the control enable module, the write enable, the update enable and the read enable according to the start instruction, acquiring, by the control enable module, a current timestamp at a first rising edge of the write enable from the standard time acquisition module as an exact time of system startup, calculating the initial storage address of the to-be-compensated delay parameter at the corresponding moment according to the exact time, and enabling the digital receiving apparatus to start to work.

14. The storage device according to claim 12, wherein the digital receiving apparatus timing start mode comprises:

step Q20, synchronizing the host computer and the digital receiving apparatus with the standard time of the standard time server, and setting start times of the one or more digital receiving apparatuses by the host computer;

step Q21, issuing, by the host computer, the start times to the one or more digital receiving apparatuses, respectively;

step Q22, forwarding, by the communication modules in the one or more digital receiving apparatuses, the start times to the control enable modules of the one or more digital receiving apparatuses, respectively; and step Q23, monitoring, by the control enable modules, the current timestamps acquired from the standard time acquisition modules, generating, by the control enable modules, the write enable, the update enable, and the read enable when the current timestamps are equal to the start times, and enabling the one or more digital receiving apparatuses to start to work.

15. The storage device according to claim 12, wherein the external input channel associated pulse start mode comprises:

step Q30, synchronizing the host computer and the digital receiving apparatus with the standard time of the standard time server, and setting start times of the one or more digital receiving apparatuses by the host computer;

step Q31, when the start times are reached, issuing, by the host computer, an external input channel associated pulse start instruction to a primary digital receiving apparatus of the one or more digital receiving apparatuses;

step Q32, generating, by the control enable module in the primary digital receiving apparatus, a start enable according to the external input channel associated pulse start instruction, and outputting, by the control enable module in the primary digital receiving apparatus, the start enable to an external multiplexer;

step Q33, dividing, by the external multiplexer, the start enable into a plurality of channels, and inputting, by the external multiplexer, the plurality of channels to the one or more digital receiving apparatuses, respectively; and step Q34, after the control enable modules of the one or more digital receiving apparatuses receive the start enable, monitoring, by the control enable modules of the one or more digital receiving apparatuses, an external input channel associated pulse, generating, by the control enable modules of the one or more digital receiving apparatuses, the write enable, the update enable, and the read enable according to the start enable, acquiring a current timestamp at a first rising edge of the write enable from the standard time acquisition module as an exact time of system startup, calculating the initial storage address of the to-be-compensated delay parameter at the corresponding moment according to the exact time, and enabling the one or more digital receiving apparatuses to start to work.

16. A processing device, comprising:
a processor adapted to execute a plurality of programs; and
a storage device adapted to store the plurality of programs;
wherein the plurality of programs are adapted to be loaded and executed by the processor to implement the digital receiving method for tracking and observing the target radio source according to claim 6.

17. The processing device according to claim 16, wherein the set start mode comprises a host computer timing start mode, a digital receiving apparatus timing start mode, and an external input channel associated pulse start mode;
the host computer timing start mode is applied to the digital receiving system with only the digital receiving apparatus;
the digital receiving apparatus timing start mode is applied to the digital receiving system with the one or more digital receiving apparatuses; and
the external input channel associated pulse start mode is applied to the digital receiving system with the one or more digital receiving apparatuses and analog input signals having channel associated pulse identification.

18. The digital receiving system for tracking and observing the target radio source according to claim 5, wherein
the standard time acquisition module is connected to the control enable module;
the control enable module is further connected to the delay parameter temporary storage module, the delay module, the analog-to-digital conversion module, and the communication module, respectively;
the communication module is further connected to the delay parameter temporary storage module and the phase parameter generation module, respectively;
the delay module is further connected to the phase parameter generation module;
the delay parameter temporary storage module is further connected to the analog-to-digital conversion module;
the analog-to-digital conversion module, the polyphase filter module, the fast Fourier transform module, and the phase compensation module are successively connected; and
the phase parameter generation module is further connected to the phase compensation module.

19. The digital receiving system for tracking and observing the target radio source according to claim 18, wherein a window function of the polyphase filter module is a Hamming window.

20. The digital receiving system for tracking and observing the target radio source according to claim 5, wherein a window function of the polyphase filter module is a Hamming window.

* * * * *